(12) United States Patent
Koraishy

(10) Patent No.: US 9,435,937 B2
(45) Date of Patent: Sep. 6, 2016

(54) SYSTEM FOR ASSEMBLING OPTICAL FILMS FOR DISPLAYS

(71) Applicant: Apple Inc., Cupertino, CA (US)

(72) Inventor: Babar M. Koraishy, San Jose, CA (US)

(73) Assignee: Apple Inc., Cupertino, CA (US)

( * ) Notice: Subject to any disclaimer, the term of this patent is extended or adjusted under 35 U.S.C. 154(b) by 177 days.

(21) Appl. No.: 14/332,111

(22) Filed: Jul. 15, 2014

(65) Prior Publication Data

US 2016/0018587 A1 Jan. 21, 2016

(51) Int. Cl.
| | |
|---|---|
| *B32B 38/18* | (2006.01) |
| *F21V 8/00* | (2006.01) |
| *B65H 3/08* | (2006.01) |
| *B65H 3/48* | (2006.01) |
| *B32B 37/18* | (2006.01) |
| *B32B 38/10* | (2006.01) |
| *B32B 38/16* | (2006.01) |

(52) U.S. Cl.
CPC ......... *G02B 6/0065* (2013.01); *B32B 38/1858* (2013.01); *B65H 3/0816* (2013.01); *B65H 3/48* (2013.01); *G02B 6/005* (2013.01); *B32B 37/18* (2013.01); *B32B 38/10* (2013.01); *B32B 38/162* (2013.01); *B32B 38/1841* (2013.01); *B32B 2307/202* (2013.01); *B32B 2309/72* (2013.01); *B32B 2457/20* (2013.01); *B65H 2801/61* (2013.01); *Y10S 901/09* (2013.01); *Y10S 901/40* (2013.01); *Y10S 901/47* (2013.01)

(58) Field of Classification Search
CPC ... B32B 37/18; B32B 38/10; B32B 38/1858; B32B 2307/202; B32B 2457/20; G02B 6/005; G02B 6/0065; G05B 19/4189; G05B 2219/31227; Y10S 901/02; Y10S 901/09; Y10S 901/40; Y10S 901/47; Y10S 901/30; B25J 9/1602

USPC ........... 156/378, 556, 708, 757; 271/97, 98; 901/9, 40, 47

See application file for complete search history.

(56) References Cited

U.S. PATENT DOCUMENTS

| | | |
|---|---|---|
| 5,407,519 A | 4/1995 | Joffe et al. |
| 7,859,607 B2 | 12/2010 | Zhang et al. |
| 7,950,132 B2 | 5/2011 | Kim et al. |
| 7,999,905 B2 | 8/2011 | Kim et al. |
| 2013/0061877 A1 | 3/2013 | Nakagawa et al. |
| 2013/0082475 A1* | 4/2013 | Fukano ............ B65G 47/91 294/188 |
| 2015/0032243 A1* | 1/2015 | Shiino ............ B25J 9/0093 700/112 |

FOREIGN PATENT DOCUMENTS

| | | | | |
|---|---|---|---|---|
| JP | 2010036467 A | * | 2/2010 | |
| JP | WO 2013157120 A1 | * | 10/2013 | ......... B25J 9/0093 |

* cited by examiner

*Primary Examiner* — George Koch
(74) *Attorney, Agent, or Firm* — Treyz Law Group, P.C.; G. Victor Treyz; Joseph F. Guihan

(57) ABSTRACT

Display backlight structures may provide backlight illumination that passes through display layers in the display. Computer-controlled equipment such as robotic arms with gripper structures may be used in assembling backlight layers such as a reflector, light guide plate, diffusers, and prism films into a backlight unit. The grippers may include mechanical grippers and vacuum heads. A vacuum gripper head may have a plenum to which a perforated plate and porous layer are attached for distributing the vacuum. Computer-controlled air sources may be used to blow streams of deionized air between backlight layers to separate the backlight layers during assembly. Release liners may be removed using robotic arms and grippers. Translation stages may move a backlight layer storage frame between stations. A cleaning tool with a solvent dispenser and air jets may clean backlight layers. A camera system may be used during alignment and positioning operations.

19 Claims, 19 Drawing Sheets

SYSTEM FOR ASSEMBLING OPTICAL FILMS FOR DISPLAYS

BACKGROUND

This relates generally to electronic devices, and more particularly, to electronic devices with displays.

Electronic devices often include displays. For example, cellular telephones and portable computers may have displays for presenting information to a user.

Displays typically include multiple layers of material. For example, a liquid crystal display may have a color filter layer, liquid crystal layer, and thin-film transistor layer sandwiched between upper and lower polarizers.

Backlight units may be used to supply backlight illumination to a display such as a liquid crystal display or other display. A backlight unit may include layers such as a reflector, a light guide plate, diffusers, and prism films. These backlight layers may be challenging to assemble with desired levels of alignment accuracy, assembly speed, and cleanliness.

It would therefore be desirable to be able to provide improved systems for assembling display layers such as display backlight layers.

SUMMARY

A backlight unit may provide backlight illumination that passes through display layers in a display. The display may be a liquid crystal display or other display. The backlight unit may be formed from backlight layers such as reflector, light guide plate, diffusers, and prism films. The backlight layers may be mounted in an electronic device housing, a backlight chassis, or other support structures.

Computer-controlled equipment such as robotic arms with gripper structures may be used in assembling backlight layers into a backlight unit. Grippers on the robotic arms may include mechanical grippers and vacuum heads.

A vacuum head may have a plenum to which a perforated plate and porous layer are attached for evenly distributing vacuum suction. When a vacuum is applied to the vacuum head, the vacuum head may hold a backlight layer at the end of a robotic arm.

Computer-controlled air sources may be used to blow streams of deionized air between backlight layers to separate the backlight layers during assembly. The air sources may be arranged around the periphery of a set of rectangular backlight layers.

Release liners may be removed from the backlight layers using robotic arms and grippers. Translation stages may move a backlight layer storage frame between stations. A cleaning tool with a solvent dispenser and air jets may clean the backlight layers.

A camera system may be used during alignment and positioning operations. A controller may control operation of the robotic arms, grippers, air sources and other computer-controlled equipment based in information from the camera system and other information.

DETAILED DESCRIPTION

Electronic devices may include displays. The displays may be used to display images for a user. Illustrative electronic devices that may be provided with displays are shown in FIGS. 1, 2, 3, and 4.

Figure 1:
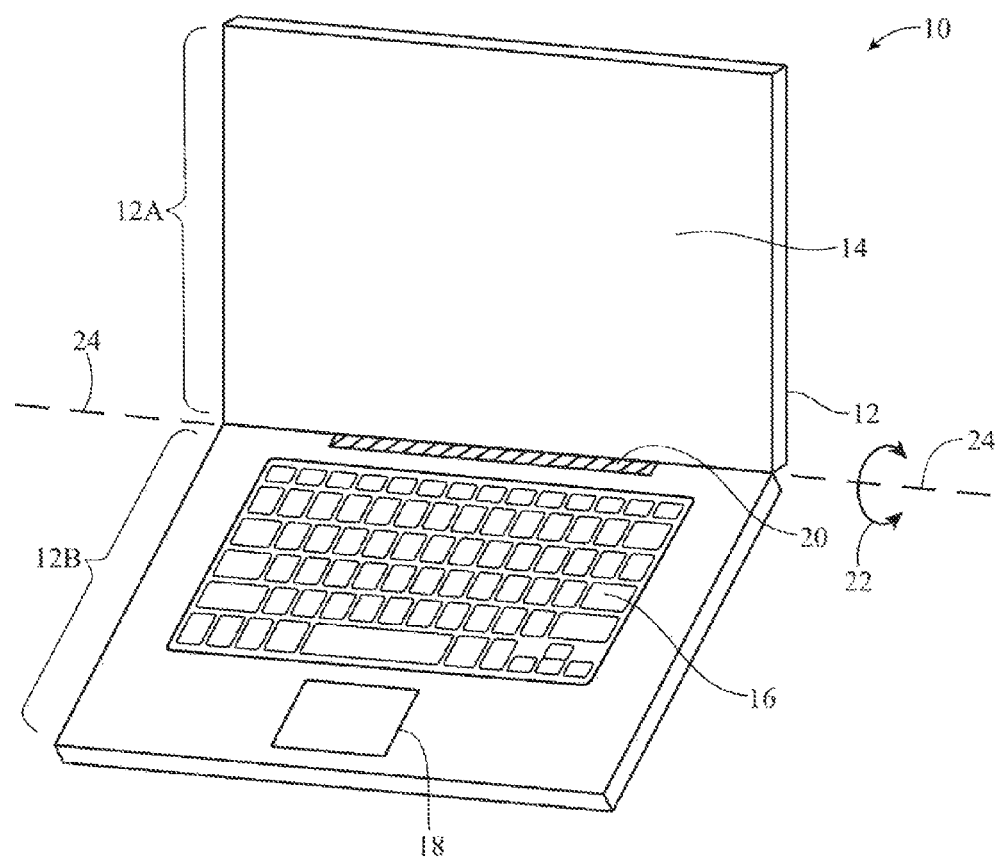
FIG. 1 is a perspective view of an illustrative electronic device such as a laptop computer with a display in accordance with an embodiment.

Illustrative electronic device 10 of FIG. 1 has the shape of a laptop computer having upper housing 12A and lower housing 12B with components such as keyboard 16 and touchpad 18. Device 10 may have hinge structures 20 that allow upper housing 12A to rotate in directions 22 about rotational axis 24 relative to lower housing 12B. Display 14 may be mounted in upper housing 12A. Upper housing 12A, which may sometimes be referred to as a display housing or lid, may be placed in a closed position by rotating upper housing 12A towards lower housing 12B about rotational axis 24.

Figure 2:
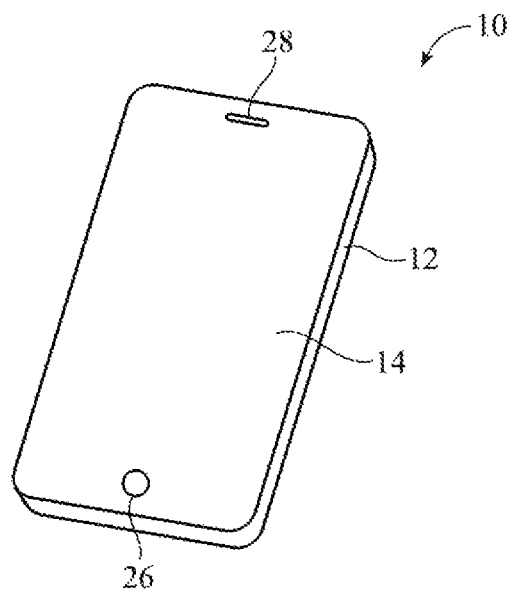
FIG. 2 is a perspective view of an illustrative electronic device such as a handheld electronic device with a display in accordance with an embodiment.

FIG. 2 shows how electronic device 10 may be a handheld device such as a cellular telephone, music player, gaming device, navigation unit, or other compact device. In this type of configuration for device 10, housing 12 may have opposing front and rear surfaces. Display 14 may be mounted on a front face of housing 12. Display 14 may, if desired, have openings for components such as button 26. Openings may also be formed in display 14 to accommodate a speaker port (see, e.g., speaker port 28 of FIG. 2).

Figure 3:
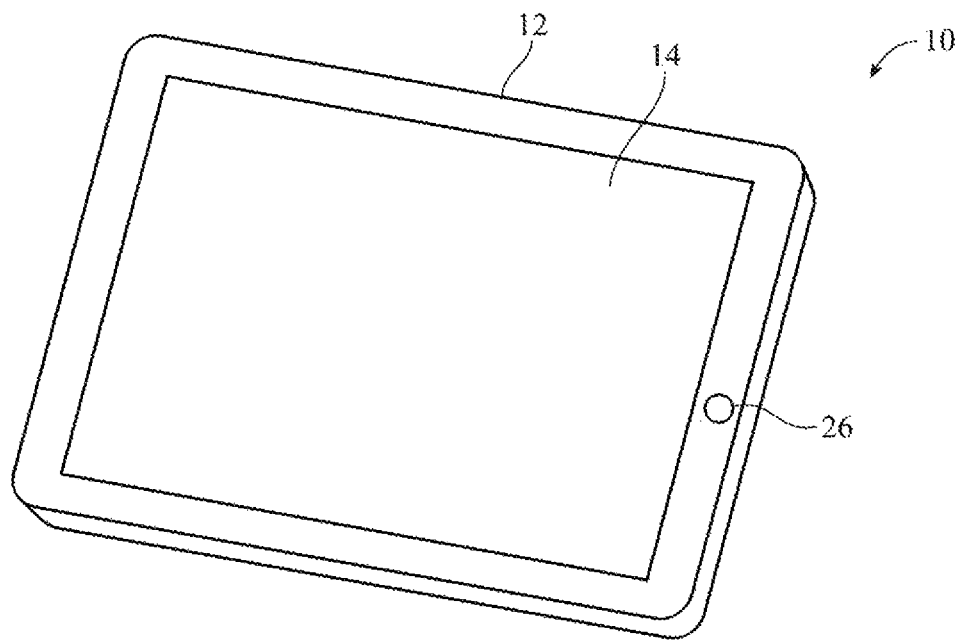
FIG. 3 is a perspective view of an illustrative electronic device such as a tablet computer with a display in accordance with an embodiment.

FIG. 3 shows how electronic device 10 may be a tablet computer. In electronic device 10 of FIG. 3, housing 12 may have opposing planar front and rear surfaces. Display 14 may be mounted on the front surface of housing 12. As shown in FIG. 3, display 14 may have an opening to accommodate button 26 (as an example).

Figure 4:
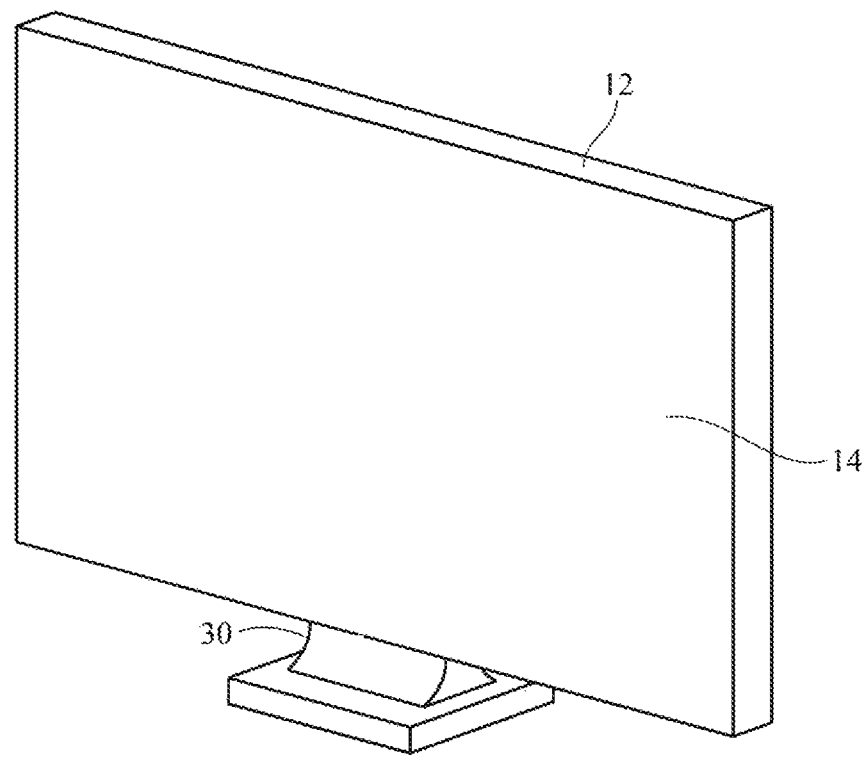
FIG. 4 is a perspective view of an illustrative electronic device such as a computer display with display structures in accordance with an embodiment.

FIG. 4 shows how electronic device 10 may be a computer display, a computer that has been integrated into a computer display, or a display for other electronic equipment. With this type of arrangement, housing 12 for device 10 may be mounted on a support structure such as stand 30 or stand 30 may be omitted (e.g., stand 30 can be omitted when mounting device 10 on a wall). Display 14 may be mounted on a front face of housing 12.

The illustrative configurations for device 10 that are shown in FIGS. 1, 2, 3, and 4 are merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Housing 12 of device 10, which is sometimes referred to as a case, may be formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Display 14 for device 10 may include display pixels formed from liquid crystal display (LCD) components or other suitable image pixel structures.

A display cover layer may cover the surface of display 14 or a display layer such as a color filter layer or other portion of a display may be used as the outermost (or nearly outermost) layer in display 14. The outermost display layer may be formed from a transparent glass sheet, a clear plastic layer, or other transparent member.

Figure 5:
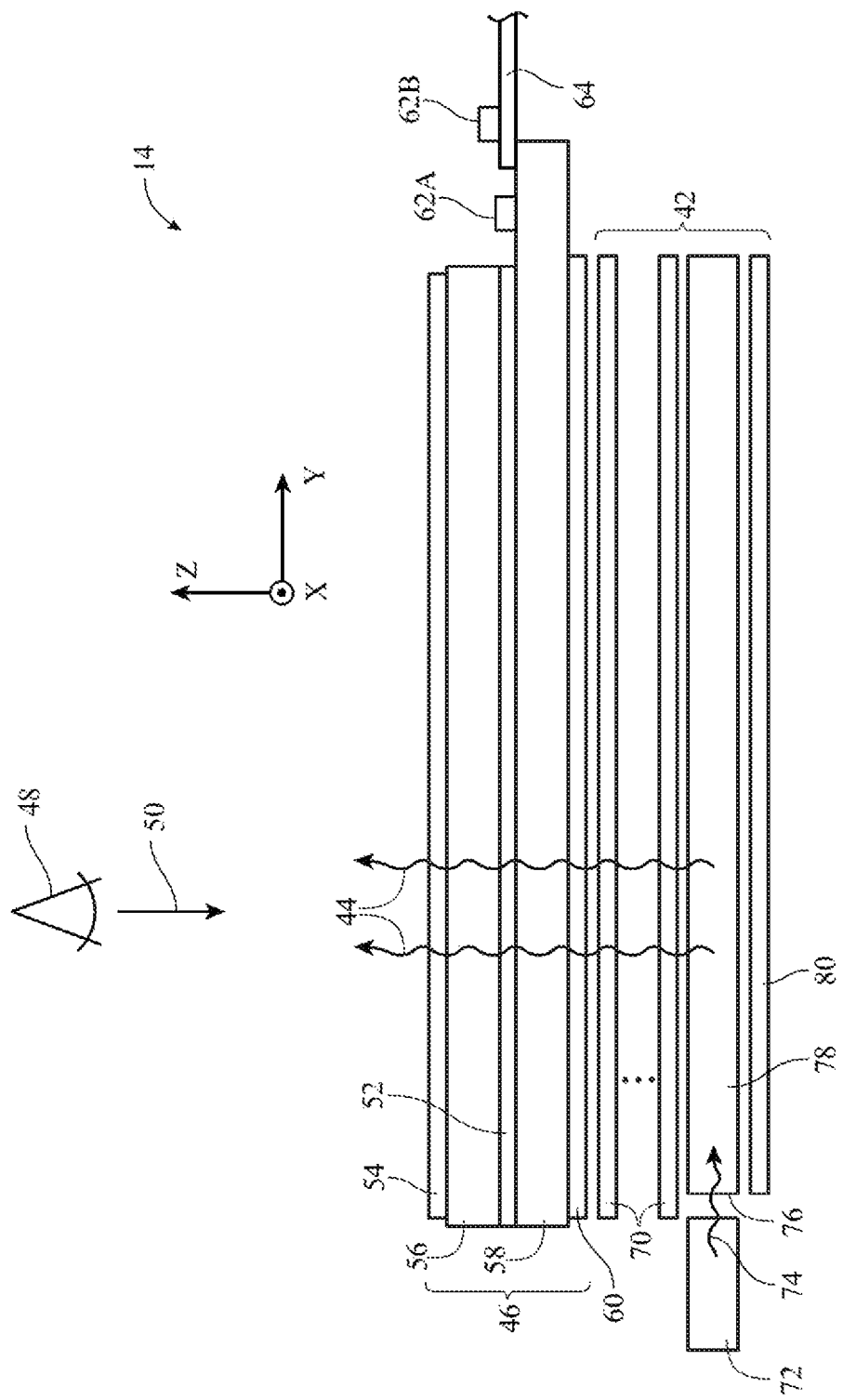
FIG. 5 is a cross-sectional side view of an illustrative display in accordance with an embodiment.

A cross-sectional side view of an illustrative configuration for display 14 of device 10 (e.g., for display 14 of the devices of FIG. 1, FIG. 2, FIG. 3, FIG. 4 or other suitable electronic devices) is shown in FIG. 5. As shown in FIG. 5, display 14 may include backlight structures such as backlight unit 42 for producing backlight 44. During operation, backlight 44 travels outwards (vertically upwards in dimension Z in the orientation of FIG. 5) and passes through display pixel structures in display layers 46. This illuminates any images that are being produced by the display pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 may form a liquid crystal display or may be used in forming displays of other types.

In a configuration in which display layers 46 are used in forming a liquid crystal display, display layers 46 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54.

Layers 58 and 56 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of thin-film transistors and associated electrodes (display pixel electrodes) for applying electric fields to liquid crystal layer 52 and thereby displaying images on display 14. Layer 56 may be a color filter layer that includes an array of color filter elements for providing display 14 with the ability to display color images. If desired, lower layer 58 may be a color filter layer and upper layer 56 may be a thin-film transistor layer. Another illustrative configuration involves forming color filter elements and thin-film transistor circuits with associated pixel electrodes on a common substrate. This common substrate may be the upper substrate or may be the lower substrate and may be used in conjunction with an opposing glass or plastic layer (e.g., a layer with or without any color filter elements, thin-film transistors, etc.) to contain liquid crystal layer 52.

During operation of display 14 in device 10, control circuitry (e.g., one or more integrated circuits on a printed circuit) may be used to generate information to be displayed on display 14 (e.g., display data). The information to be displayed may be conveyed to a display driver integrated circuit such as circuit 62A or 62B using a signal path such as a signal path formed from conductive metal traces in a rigid or flexible printed circuit such as printed circuit 64 (as an example).

Backlight structures 42 may include a light guide plate such as light guide plate 78. Light guide plate 78 may be formed from a transparent material such as clear glass or plastic. During operation of backlight structures 42, a light source such as light source 72 may generate light 74. Light source 72 may be, for example, an array of light-emitting diodes. If desired, light sources such as light source 72 may be located along multiple edges of light guide plate 78.

Light 74 from light source 72 may be coupled into edge surface 76 of light guide plate 78 and may be distributed in dimensions X and Y throughout light guide plate 78 due to the principal of total internal reflection. Light guide plate 78 may include light-scattering features such as pits or bumps. The light-scattering features may be located on an upper surface and/or on an opposing lower surface of light guide plate 78.

Light 74 that scatters upwards in direction Z from light guide plate 78 may serve as backlight 44 for display 14. Light 74 that scatters downwards may be reflected back in the upwards direction by a reflective film such as reflector 80. Reflector 80 may be formed from a reflective material such as a reflective layer of white plastic, a plastic layer formed form a stack of plastic films with alternating high and lost indices of refraction that serve as a high efficiency reflector, or other reflective materials.

To enhance backlight performance for backlight structures 42, backlight structures 42 may include optical films 70. Optical films 70 may include one or more diffuser layers for helping to homogenize backlight 44 and thereby reduce hotspots and one or more prism films (also sometimes referred to as turning films or brightness enhancement films) for collimating backlight 44.

Compensation films for enhancing off-axis viewing may be included in optical films 70 or may be incorporated into other portions of display 14 (e.g., polarizer layers). Optical films 70 may also include other backlight layers, if desired.

Optical films 70 may overlap the other structures in backlight unit 42 such as light guide plate 78 and reflector 80. For example, if light guide plate 78 has a rectangular footprint in the X-Y plane of FIG. 5, optical films 70 and reflector 80 may have matching rectangular footprints.

Figure 6:
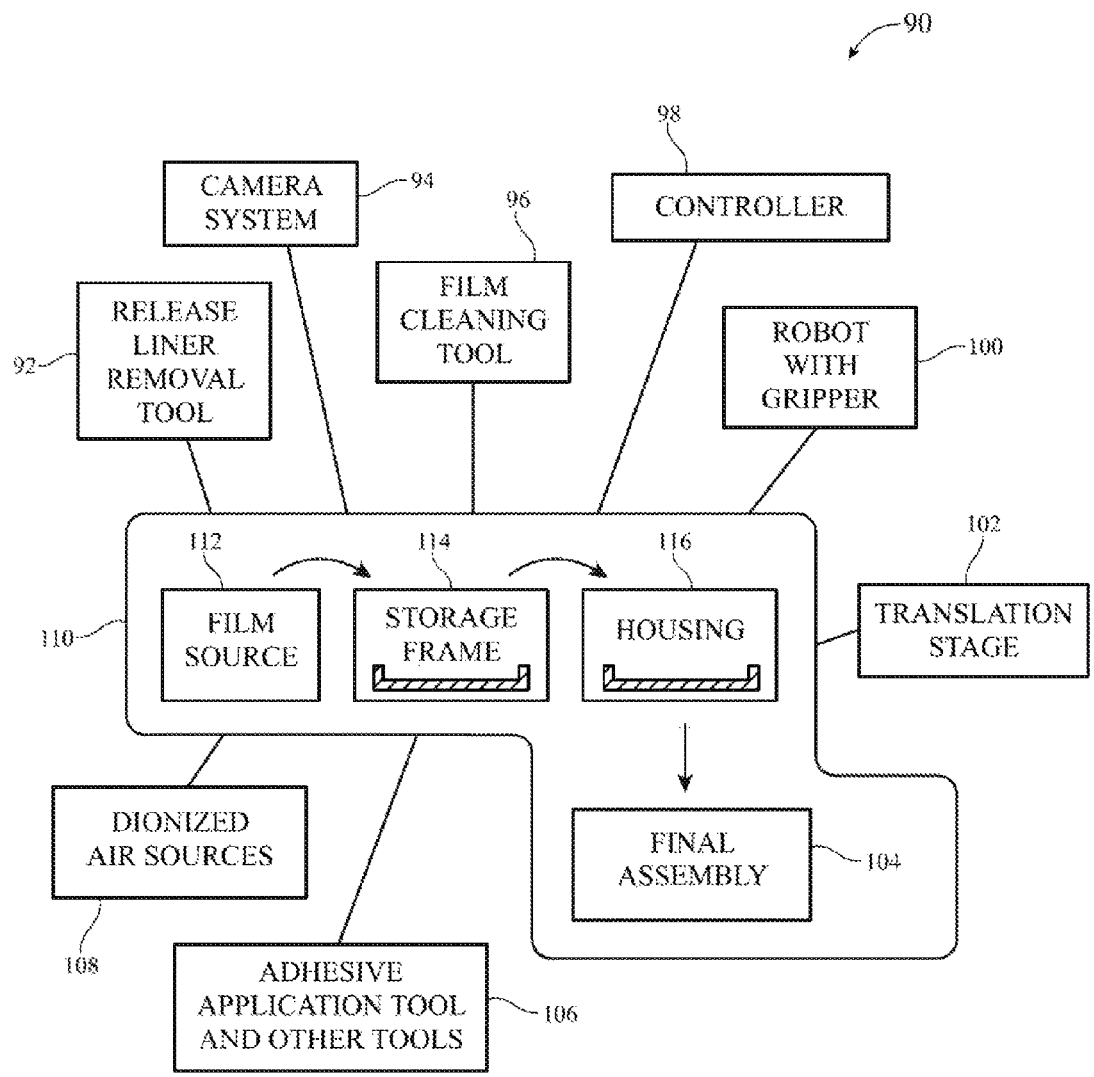
FIG. 6 is a system diagram of illustrative equipment of the type that may be used in assembling display backlight layers in accordance with an embodiment.

FIG. 6 is a diagram of an illustrative system that may be used for assembling structures for display 14 such as backlight structures 42. As shown in FIG. 6, system 90 includes equipment for processing structures 110 (e.g., backlight layers such as a reflector, light guide plate, diffusers, prism films, etc.).

The equipment of system 90 may obtain backlight layers from a source of backlight layers such as film source 112. Source 112 may contain stacks of backlight layers such as one or more stacks of diffusers, one or more stacks of prism films, one or more stacks of reflectors, and one or more stacks of light guide plates (as examples). Each stack may contain a single type of backlight layer (or other display layer) or, if desired, stacks of backlight films may be provided that contain layers organized in a predetermined pattern (e.g., a stack containing a number of different types of backlight layers in a predetermined repeating order). The equipment of system 90 may move backlight layers (or other display layers such as polarizers, glass substrates, etc.) from source 112 to storage frame 114.

A housing such as housing 116 or other display backlight unit support structure (e.g., a chassis, etc.) may receive backlight layers from one or more storage frames 114. After backlight unit 42 has been assembled, display 14 and the other components of device 10 can be assembled to form a finished device 10 (e.g., device 10 of FIG. 1, 2, 3, or 4 or other suitable device).

Computer-controlled release liner removal tool 92 may be used to remove protective release liner layers from backlight layers. For example, tool 92 may peel release liners off of light guide plates and other layers in backlight unit 42. Release liners may also be removed from backlight layers manually.

Camera system 94 may include on or more cameras that form a machine vision system. Camera images may be viewed by personnel operating the equipment of system 90 in real time. Camera data may also be processed for use in automatically guiding the equipment of system 90 so that backlight units may be assembled autonomously. For example, camera system 94 may be used to gather information on the position of the edges of the backlight layers in backlight unit 42. System 90 may use information on the location of the edges of the backlight layers in performing alignment operations and other assembly operations.

Film cleaning tool 96 may be used to remove dirt and other extraneous particles from the backlight layers of backlight unit 42. The backlight layers may become statically charged during handling. The use of film cleaning tool 96 may help ensure that any particles that have been attracted to a backlight layer through electrostatic attraction are removed.

Controller 98 may be based on a microcontroller, a microprocessor, memory (e.g., volatile memory and/or non-volatile memory) and other storage, application-specific integrated circuits, and/or other circuit resources, one or more networked computers, stand-alone computing equipment, or other control circuitry. Controller 98 may be used in running code that controls the operation of system 90.

One or more computer-controlled tools (sometimes referred to as robots or robotic tools) may be used to manipulate the layers of backlight structures 42. For example, computer-controlled layer manipulation tools such as a robot 100 may be provided with vacuum gripper equipment to hold backlight layers during processing.

The tools of system 90 may be arranged in one or more stations. To move backlight layers and other structures between stations (e.g., to move storage frames, housings, etc.), one or more translation stages may be provided in system 90 such as translation stage 102. Stages 102 may include trays, storage frames, or other structures that run along rails between stages, may include conveyor belts, or may include other equipment for moving backlight structures and other device structures between different locations in system 90.

Backlight layers may be formed from materials such as polymers that tend to adhere to each other through due to electrostatic attraction. Computer-controlled air sources such as deionized air sources 108 may be used to help separate backlight layers from each other and may be used to maintain separated layers in their separated state.

A housing, chassis, or other support structure may be provided with alignment features such as one or more registration pins. The layers of material in backlight unit 42 may be provided with corresponding openings that mate with the registration pins, thereby aligning the layers of material with respect to each other. Adhesive application tool 106 may be used to attach adhesive tape over the exposed tips of the registration pins to retain the backlight layers within backlight unit 42 following assembly. If desired, tool 106 may include other equipment for securing backlight layers within backlight unit 42 (e.g., using fasteners, adhesive, etc.).

Figure 7:
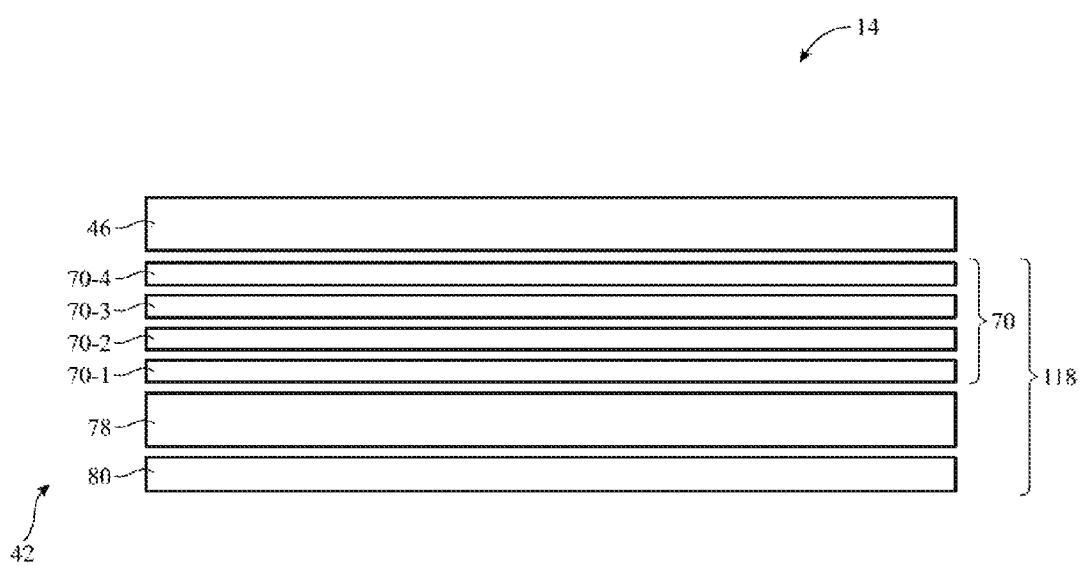
FIG. 7 is a cross-sectional side view of an illustrative display showing backlight layers that may be used in constructing a backlight unit in accordance with an embodiment.

In general, system 90 may be used to assembly any suitable structures in device 10 such as one or more display layers, housing structures, etc. Arrangements in which system 90 is used in assembling backlight layers such as reflector layers, light guide plates, diffuser layers, and prism films into backlight unit 42 are sometimes described herein as an example. A cross-sectional side view of an illustrative display that may be assembled using system 90 is shown in FIG. 7. In the example of FIG. 7, display 14 includes display layers 46 (e.g., a liquid crystal display module) and backlight unit 42. Backlight unit 42 (sometimes referred to as a backlight or backlight structures) may include multiple backlight layers 118. Layers 118 may, for example, include reflector 80, light guide plate 78, and optical films such as lower diffuser 70-1, prism films 70-2 and 70-3, and upper diffuser layer 70-4. Other configurations may be used for backlight unit 42 if desired. The example of FIG. 7 is merely illustrative.

Figure 8:
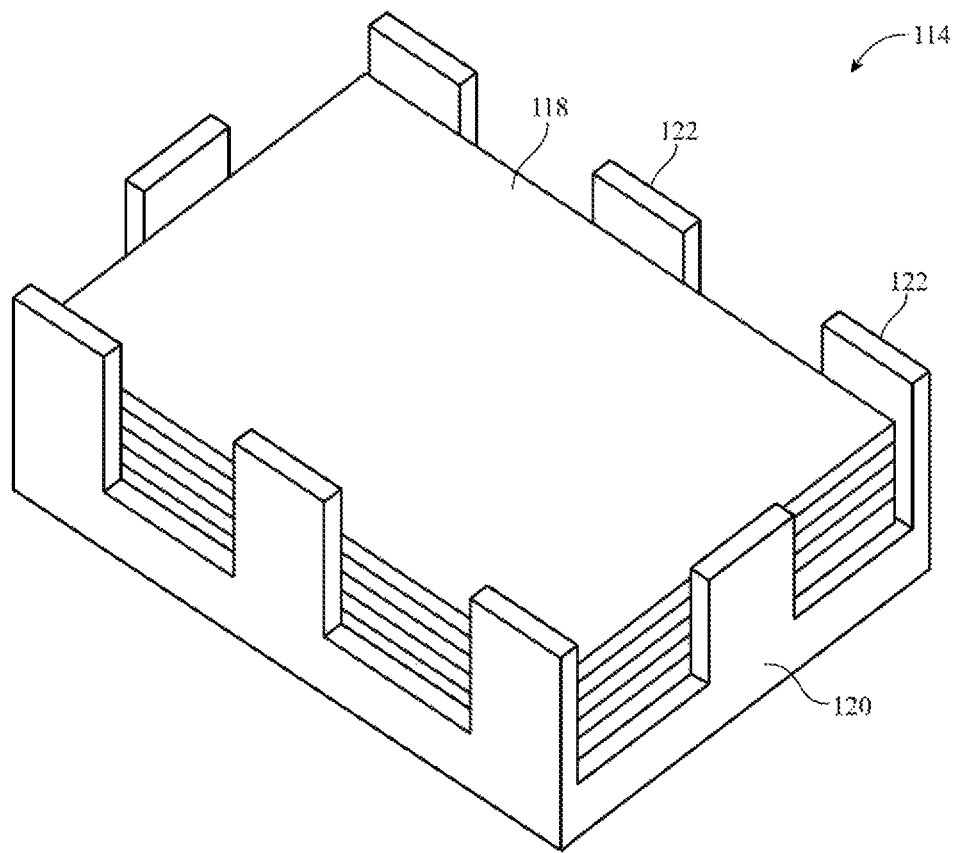
FIG. 8 is a perspective view of an illustrative storage frame of the type that may be used to hold backlight layers for a backlight unit in accordance with an embodiment.

During backlight assembly, system 90 may temporarily retain backlight layers 118 in one or more storage structures such as storage frame 114 of FIG. 8. Storage frame 114 may have a base such as base 120 and a series of vertically extending guide fingers such as fingers 122 or other suitable backlight layer guide structures. Fingers 122 may be arranged in a rectangle or other suitable pattern that defines an opening to receive backlight layers 118. If, for example, backlight layers 118 are rectangular, fingers 122 may be organized to form a central rectangular opening for storage unit (frame) 114. As shown in FIG. 8, rectangular backlight layers 118 may be stored in the rectangular opening defined by fingers 122.

Storage frames such as frame 114 of FIG. 8 may be used to temporarily hold stacks of backlight layers 118 for transfer between processing stations, to provide a buffer between tools that are operating at different speeds (e.g., to allow one tool to store its output at a rate that is appropriate for that tool without being concerned about the input rate of one or more downstream tools that may consume that output), to hold backlight layers 118 that are being assembled in a particular order (e.g., a particular layer on the bottom, another layer above the bottom layer, and so forth), may be used to hold layers 118 for shipment to a remote facility, or may be otherwise used in temporarily storing layers 118 during processing of layers 118 to form backlight units 42 and displays 14.

Backlight layers 118 may be formed from dielectric materials (e.g., clear and/or translucent polymer layers). These layers are often not sufficiently conductive to readily discharge static electricity. Due to the presence of static charge on layers 118, layers 118 may have a propensity to adhere to each other. This can pose handling challenges. To help control the separation of layers 118 from each other so that layers 118 can be positioned where desired without becoming stuck due to static charge, deionized air may be blown between adjacent layers 118.

Figure 9:
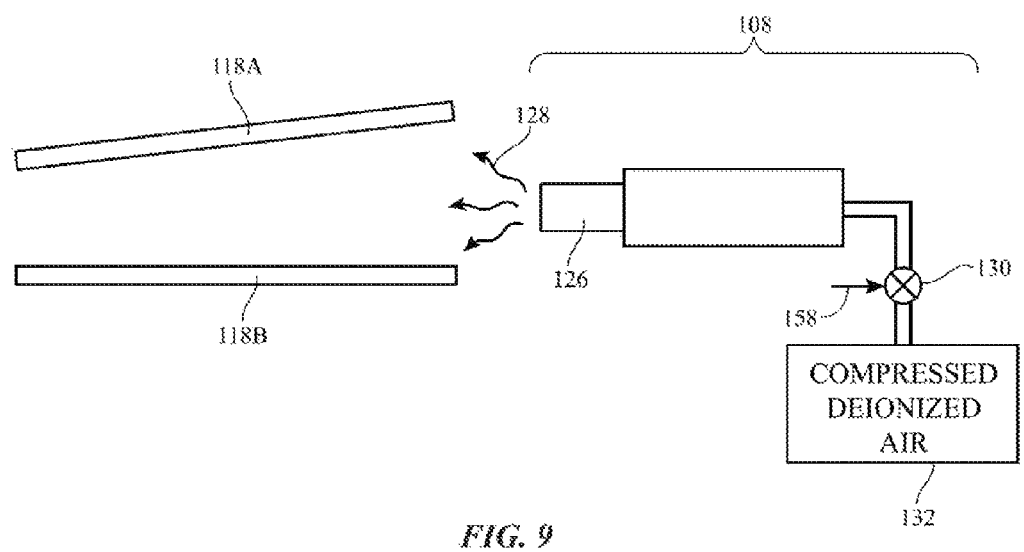
FIG. 9 is a cross-sectional side view of an illustrative compressed air nozzle being used to control the separation of adjacent backlight layers by blowing across a storage frame or otherwise blowing between backlight layers during assembly of a backlight unit in accordance with an embodiment.

FIG. 9 is a diagram showing how streams of compressed deionized air may be used in controlling the separation of adjacent layers 118. As shown in FIG. 9, pressurized deionized air dispensing system 108 may dispense streams of deionized air 128 between adjacent backlight layers 118 such as adjacent layers 118A and 118B. Air 128 may be dispensed in short puffs, may be dispensed in longer sustained bursts, or may be dispensed (blown) with other air flow characteristics.

Pressurized deionized air dispensing system 108 may include a source of compressed deionized air such as compressed air source 132. Air source 132 may contain air, nitrogen, or other gas. One or more computer-controlled values such as valve 130 may control the flow of air from source 132 to air dispensing nozzle 126. Valve 130 may, for example, be controlled by controller 98 of FIG. 6 using control signals at control input 158.

Different flow profiles (air flow strength F versus time t) may be used for different applications (e.g., initial layer separation versus maintaining separation of layers that have already been separated, separating different types of layers from each other, separating layers in an initial stack of layers of the same type, separating layers that have been stacked with layers of other types in a storage frame, etc.). Examples of illustrative air flow profiles that may be used with air dispensing system 108 are shown in FIG. 10, which shows a single short puff of air, FIG. 11, which shows a pair of puffs, and FIG. 12, which shows a longer burst of air characterized by a relatively long ramp up time, a relatively long steady sustained flow value, and a relatively long ramp down time.

Figure 10:
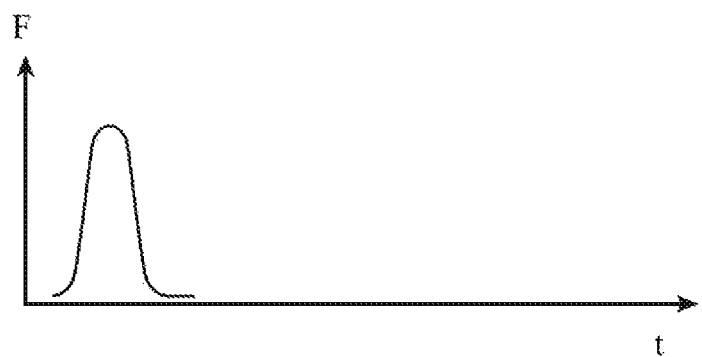
FIGS. 10, 11, and 12 are illustrative air jet strength profiles that may be used by deionized air dispensers when handling backlight layers in accordance with an embodiment.
Figure 11:
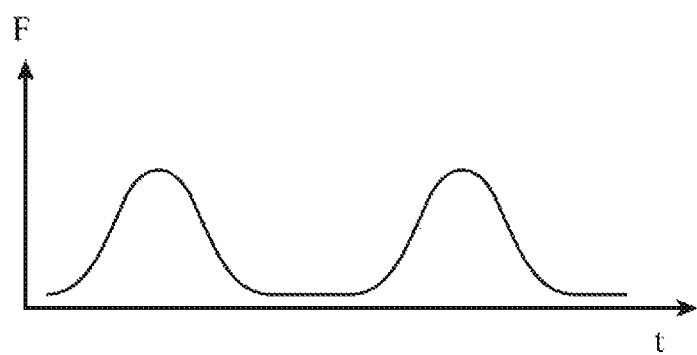
Figure 12:
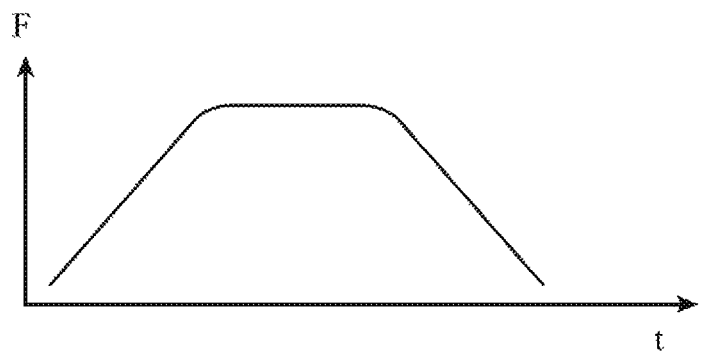

The examples of FIGS. 10, 11, and 12 are merely illustrative. Other types of air flows may be used by system 108 to handle backlight layers 118 if desired. Moreover, multiple air dispensing nozzles may be used at the same time to handle a stack of backlight layers. As an example, there may be one nozzle, two nozzles (e.g., nozzles on opposing edges of a rectangular stack of backlight layers 118 or at right angles to each other), three nozzles located at three different edges of the backlight layers, or four nozzles each located at a different respective edge in a set of stacked backlight layers 110. In a multi-nozzle arrangement, each nozzle may dispense a respective stream of air with an identical and synchronized air flow profile or different nozzles may dispense different air flows (e.g., one side of a four nozzle system may deliver an initial puff of air, followed by sustained streams of air from all four sides, etc.).

Figure 13:
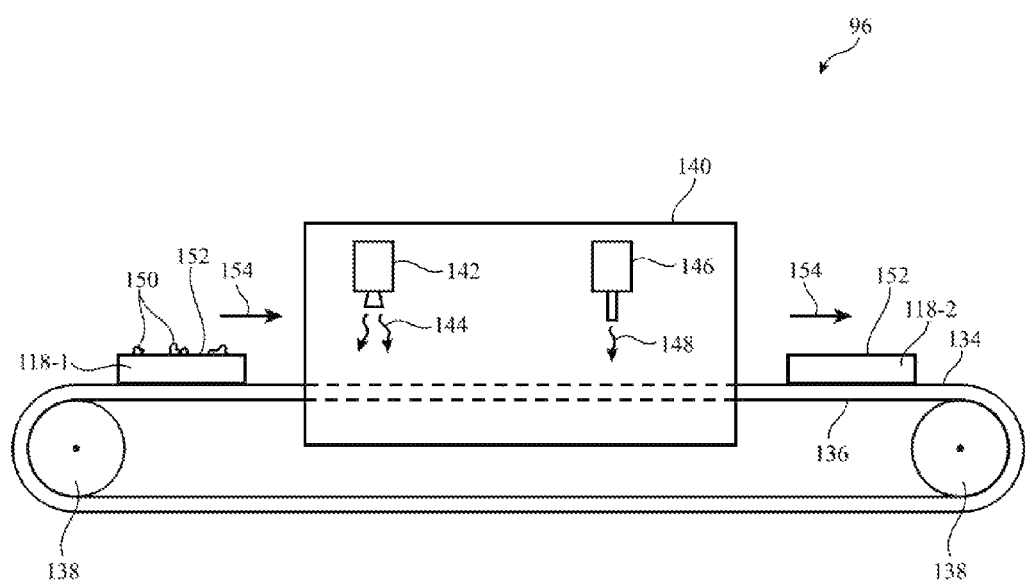
FIG. 13 is a cross-sectional side view of an illustrative backlight layer cleaning tool in accordance with an embodiment.

It may be desirable to operate system 90 in a clean room environment to reduce particulates. Backlight layers 118 may also be cleaned using a cleaning tool such as tool 96 of FIG. 13. As shown in FIG. 13, tool 96 may have a moving surface such as moving upper surface 134 of conveyor belt 136. Upper surface 134 of belt 136 may be moved in direction 154 by running belt 136 around clockwise-spinning rollers 138.

Initially, a backlight layer such as illustrative backlight layer 118-1 may have a surface such as surface 152 on which dirt or other contaminant particles 150 are present. As belt 136 moves layer 118-1 through cleaning chamber 140, particles 150 may be removed, as illustrated by clean upper surface 152 on backlight layer 118-2 at the exit of chamber 140. Cleaning chamber 140 may contain one or more tools for cleaning backlight layers. For example, chamber 140 may include a solvent mister such as mister 142 or other solvent dispenser that dispenses a mist of solvent 144 onto the surface of each backlight layer. Chamber 140 may also contain air nozzles such as nozzle 146 that dispense streams of clean air 148 (e.g., deionized air), thereby blowing away and removing excess solvent from the surface of each backlight layer. There may be any suitable number of solvent dispensing nozzles and any suitable number of pressurized air dispensing nozzles in system 96 (e.g., one solvent dispensing nozzle and one set of air dispensing nozzles, multiple stages of solvent/air nozzles through which the backlight layers pass in succession, etc.).

Figure 14:
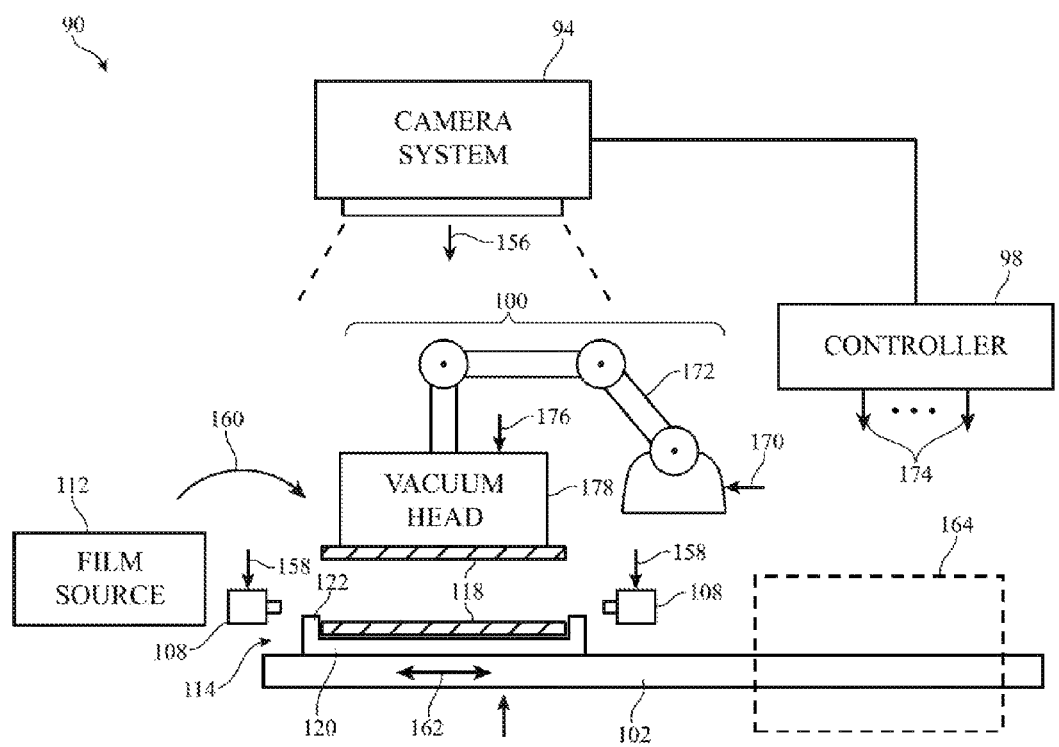
FIG. 14 is a diagram of robotic equipment for manipulating backlight layers during backlight layer assembly in accordance with an embodiment.

FIG. 14 is a diagram of a camera system and robotic equipment of the type that may be used in system 90 to handle backlight layers 118. As shown in FIG. 14, camera system 94 may be used to view backlight layers 118 and associated equipment in direction 156. Controller 98 may use information from camera system 94 in aligning backlight layers 118 with each other and with other structures in devices being assembled. Controller 98 may have multiple outputs such as outputs 174 for supplying control signals. For example, controller 98 may issue control signals on outputs 174 that are supplied to inputs 158 of pressurized deionized air dispensers 108. Control signals on outputs 174 may also be supplied to robotic arm 172 of equipment 100 (e.g., at input 170) and to control input 176 of vacuum head 178 of equipment 100.

Equipment 100 may be computer-controlled (robotic) equipment with a gripper formed from vacuum head 178. When vacuum is applied to a backlight layer 118 using head 178, the backlight layer will be attached to the underside of head 178 by suction. When the vacuum of head 178 is removed, the backlight layer that is attached to head 178 will be released.

In the example of FIG. 14, robotic equipment 100 is using vacuum head 178 to pick up backlight layers 118 from backlight layer source 112 and is being used to deposit layers 118 into backlight layer storage frame 114. Guide structures such as fingers 122 may be used to help center backlight layers 118 on base 120 of frame 114. Air dispensing systems 108 may be used to supply streams of air that help prevent layers 118 from becoming stuck to each other. Systems 108 may be located around the periphery of holder 114, around the periphery of film source 112, and elsewhere in system 90.

System 90 may have multiple stages. For example, system 90 may have a first station that is formed from vacuum head 178 and robotic arm 172 and a second station such as station 164. Translation stage 102 may be used to move backlight layers 118 between stations in system 90. For example, stage 102 may be moved in directions 162 to move storage frame 114 between the first and second stations of system 90 and other stations in system 90. Translation stage 102 may be formed from a carriage that rides on a rail. Motors or other positioning equipment may be used to move the carriage along the rail. Conveyor belts or other translation equipment may be used in system 90, if desired.

The stations in system 90 may perform tasks such as retrieving backlight layers 118 from a source (e.g., source 112), assembling backlight layers 118 in a storage frame such as frame 114, placing backlight layers 118 in a chassis, housing structure, or other support structure, cleaning backlight layers 118, removing release liner layers from backlight layers 118, aligning layers 118, and performing other operations on backlight layers 118.

In the example of FIG. 14, arm 172 of robotic system 100 is being used to position vacuum head 178. Vacuum head 178 may be directed to grip backlight layers 118. Once a backlight layer has been picked up by vacuum head 178, computer-controlled arm 172 may position that backlight layer 118 as desired. For example, system 100 may use head 178 to pick up a backlight layer 118 from a stack of layers in source 112 and move that backlight layer 118 to frame 114 in direction 160. System 100 may then use arm 172 to control the position of the attached backlight layer relative to frame 114 and/or the backlight layers that are already in frame 114. Air dispensing systems 108 may be used to help control the position of layers 118 (e.g., to help separate the top backlight layer in source 112 from the other backlight layers in source 112, to help prevent layers 118 from becoming stuck to each other prematurely in frame 114, to help separate layers in frame 114 when a layer is being removed from frame 114, etc.). Air sources 108 and system 100 may also be used when mounting backlight layers in housing 12, a backlight unit chassis, or other support structure.

Figure 15:
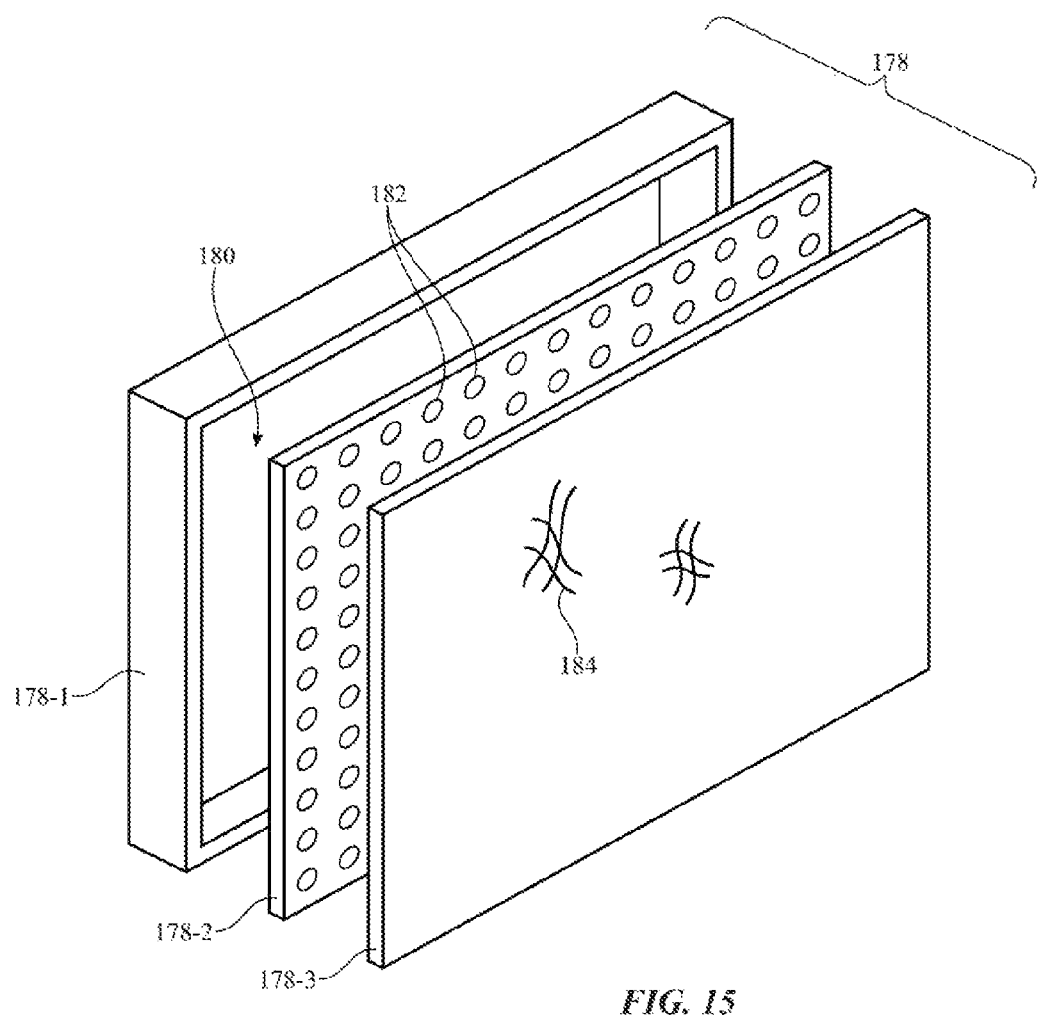
FIG. 15 is an exploded perspective view of an illustrative vacuum head for use in gripping backlight layers in accordance with an embodiment.

A perspective view of illustrative components that may be used in forming vacuum head 178 is shown in FIG. 15. As shown in FIG. 15, vacuum head may have manifold structure 178-1, perforated plate 178-2, and porous media layer 178-3. Manifold 178-1 may have a cavity such as cavity 180. Cavity 180 may be rectangular in shape and may be coupled to a source of vacuum. Manifold 178-1 distributes the vacuum across the entirety of rectangular perforated plate 178-2. Perforated plate 178-2 has an array of openings such as perforations 182. Perforations 182 may have diameters of 0.5 to 2 mm, less than 2 mm, 1-3 mm, or more than 0.5 mm. Perforations 182 may be arranged in an array of rows and columns or other suitable pattern. In an array configuration, perforations 182 may be provided on a pitch (perforation-to-perforation spacing) of 0.5 to 2 mm, more than 0.5 mm, or less than 2 mm (as examples).

Porous media layer 178-1 may have fibers 184 or other material that forms small pores. Porous media layer 178-1 may, for example, be formed from an open-cell foam, from a fabric, from a mesh, from a fibrous material, or from other material that has small passageways (e.g., less than 0.3 mm, less than 0.5 mm, or more than 0.01 mm in diameter). During operation, vacuum head 178 forms a gripper apparatus that picks up backlight layers 118. A backlight layer 118 will be attracted to the surface of head 178 that is formed from layer 178-3 when vacuum is applied to manifold 178-1. Openings 182 in plate 178-2 and porous layer 178-3 help regulate the flow of air into the vacuum and help evenly distribute the vacuum across the surface of head 178. The small pore size of porous layer 178-3 creates a gentle suction force that avoids damaging sensitive optical films such as backlight layers 118.

Figure 16:
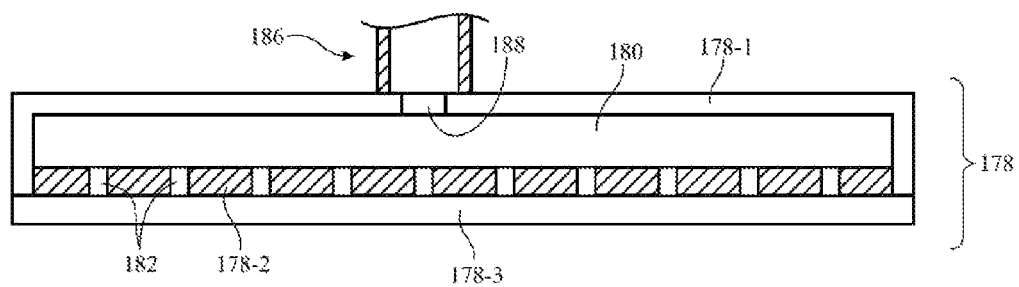
FIG. 16 is a cross-sectional side view of the vacuum head of FIG. 15 in accordance with an embodiment.

FIG. 16 is a cross-sectional side view of head 178. As shown in FIG. 16, vacuum is applied to the rear of plenum 178-1 via vacuum tube 186 and opening 188 in the rear of plenum 178-1. Cavity 180 distributes vacuum across perforated plate 178-2 and porous layer 178-3. Layer 178-3 preferably has smaller openings than perforations 182 and therefore helps ensure that vacuum head 178 provides gentle suction when activated by controller 98.

Figure 17:
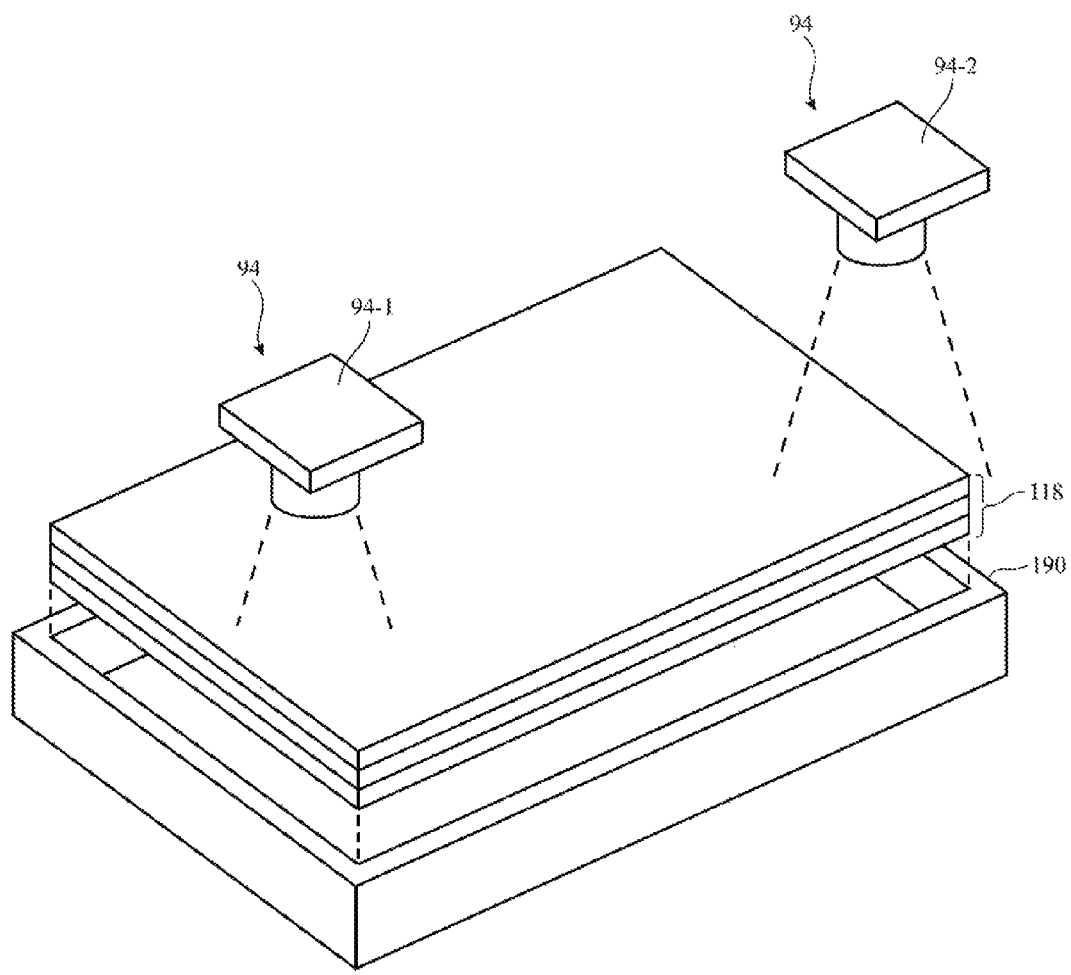
FIG. 17 is a perspective view of an illustrative camera system for monitoring backlight layers during backlight assembly operations in accordance with an embodiment.

FIG. 17 shows how camera system 94 may have cameras such as cameras 94-1 and 94-2. There may be one or more cameras, two or more cameras, three or more cameras, or four or more cameras in camera system 94. Digital image data from the camera(s) in system 94 may be processed by controller 98 to allow controller 98 to automatically control some or all of the operations involved in the assembly of backlight units 42 in system 90. As shown in FIG. 17, for example, each camera in system 94 may inspect a respective corner of backlight layers 118. Image data from the corners of a backlight layer or stack of backlight layers 118 allows the backlight layers 118 to be aligned with each other or other structures such as illustrative structure 190 of FIG. 17 (e.g., in lateral dimensions parallel to the plane of layers 118 in the example of FIG. 17). Structures such as structure 190 of FIG. 17 may include plastic backlight unit chassis structures, plastic chassis structures that include molded plastic over metal frame structures, metal chassis structures, other backlight support structures, metal or plastic housing structures (e.g., portions of housing 12 of device 10), or other device structures. Camera system 94 may also be used during operations to align backlight layers 118 to storage frame 114.

The polymer layers that make up backlight layers 118 may initially be coated with sacrificial coatings called release liners. Release liners are thin flexible films that are used to protect layers 118 prior to assembly in a backlight. The release liners are removed from backlight layers 118 before backlight layers 118 are assembled to form backlight unit 42.

Figure 18:
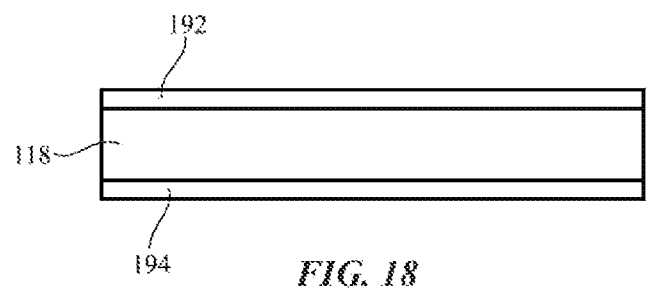
FIG. 18 is a cross-sectional side view of an illustrative backlight layer that has upper and lower release liners in accordance with an embodiment.
Figure 19:
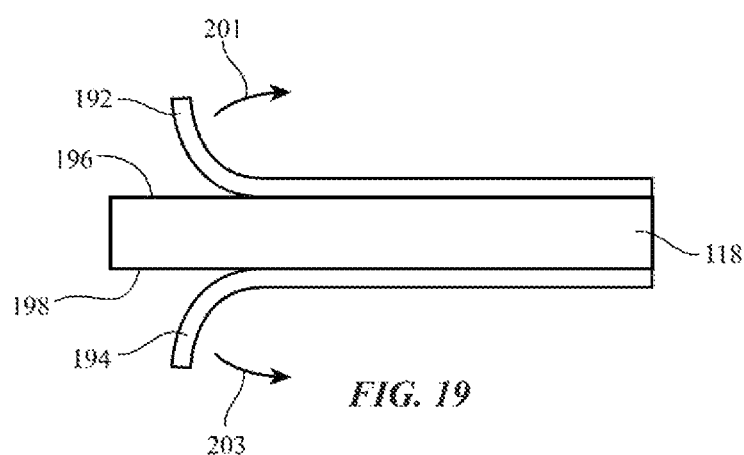
FIG. 19 is a cross-sectional side view of the illustrative backlight layer of FIG. 18 showing how the release liners can be removed during assembly of a backlight unit in accordance with an embodiment.
Figure 20:
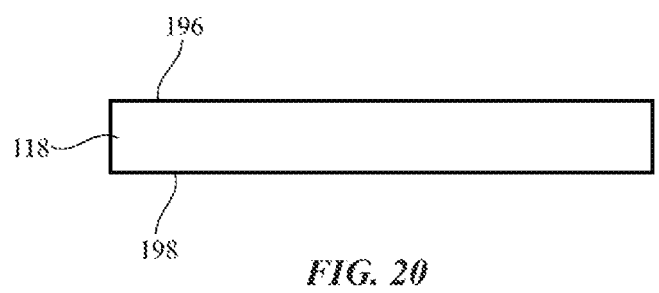
FIG. 20 is a cross-sectional side view of the backlight layer of FIGS. 18 and 19 following removal of the release liners in accordance with an embodiment.

A cross-sectional side view of an illustrative backlight layer with release liners is shown in FIG. 18. As shown in FIG. 18, release liners 192 and 194 may be used to cover backlight layer 118 and thereby protect layer 118 during initial handling (e.g., when shipping layer 118 to a manufacturer, during long-term storage, etc.). As shown in FIG. 19, when it is desired to use backlight layer 118 in a backlight unit, upper release liner 192 may be peeled away from upper surface 196 of layer 118 in direction 201 and lower release liner 194 may be peeled away from opposing lower surface 198 of layer 118 in direction 203. Following removal of release liners 192 and 194, backlight layer 118 has exposed upper and lower surfaces such as upper surface 196 and lower surface 198.

Figure 21:
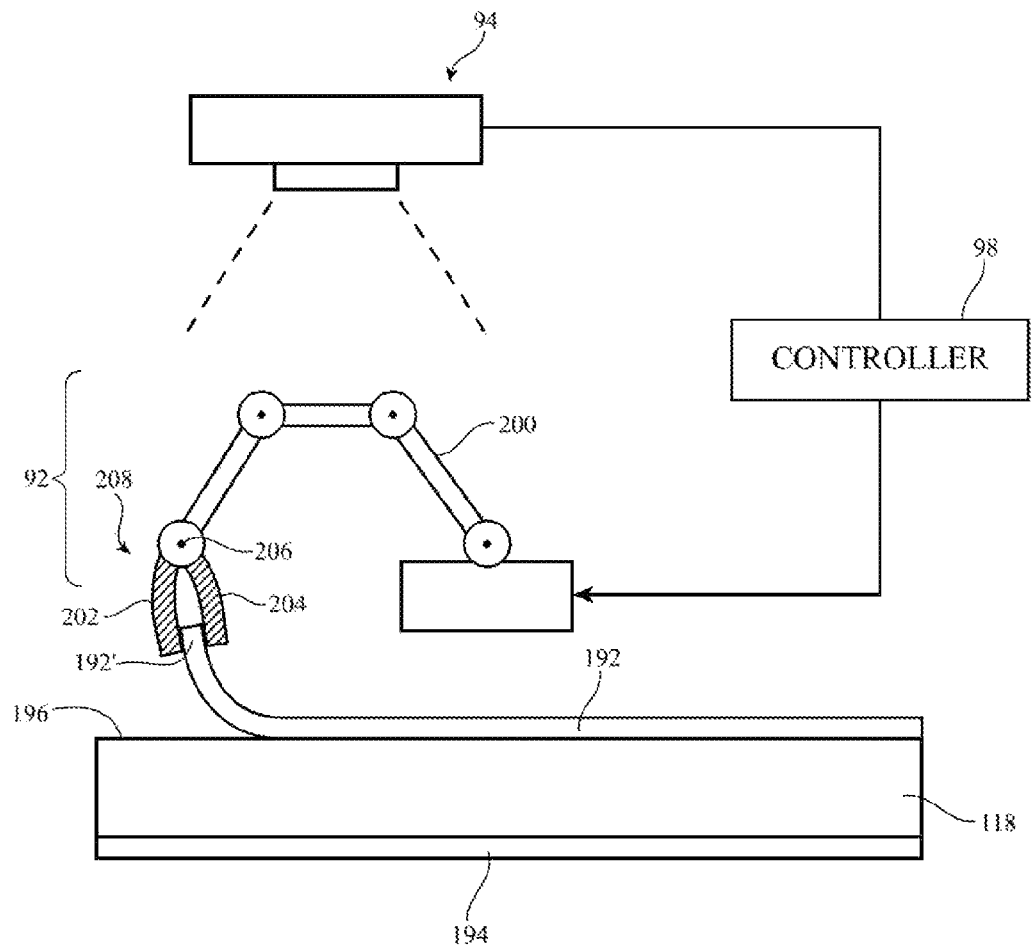
FIG. 21 is a diagram of illustrative robotic equipment for removing release liners from backlight layers in accordance with an embodiment.

Release liners 192 and 194 may be removed manually and/or using computer-controlled equipment in system 90 such as release liner removal tool 92. An illustrative release liner removal tool that is being used to remove release liner 192 from upper surface 196 of backlight layer 118 is shown in FIG. 21. As shown in FIG. 21, controller 98 may use camera system 94 to monitor backlight layer 118 during release liner removal operations. Release liner removal tool 92 may include robotic (computer-controlled) arm 200 and computer-controlled gripper 208. Gripper 208 may be a mechanical gripper with claws 202 and 204 that pivot about pivot structure 206. Claws 202 and 204 may be moved away from each other when it is desired to open gripper 208. When it is desired to grip an object such as end 192' of release liner 192, claws 202 and 204 may be moved towards each other. Controller 98 may control the operation of release liner removal tool 92 in real time based on information from camera 94 and/or other information.

Figure 22:
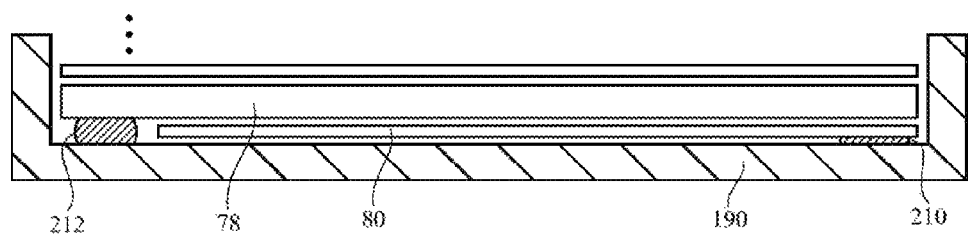
FIG. 22 is a cross-sectional side view of an illustrative display backlight unit showing how strips of adhesive may be used in securing display layers within a backlight unit support structure in accordance with an embodiment.

FIG. 22 shows how backlight layers may be assembled into a support structure such as support structure 190 using system 90 (e.g., using tool 100 and/or other equipment). Support structure 190 may be formed from a portion of housing 12, may be formed from a backlight unit chassis (plastic, metal, etc.), or may be formed form other structures in device 10 that are configured to receive backlight layers 118. In the example of FIG. 22, the layers that are initially installed in support structure 190 include reflector 80 and light guide plate 78. Adhesive strip 210 is used to attach reflector 80 to the inner surface of support structure 190. Adhesive strip 212 is used to attach light guide plate 78 to the inner surface of support structure 190. Strips 210 and 212 may run into the page in the orientation of FIG. 22. Additional backlight layers (e.g., layers 70-1, 70-2, 70-3, and 70-4) may be assembled on top of reflector 80 and light guide plate 78.

Figure 23:
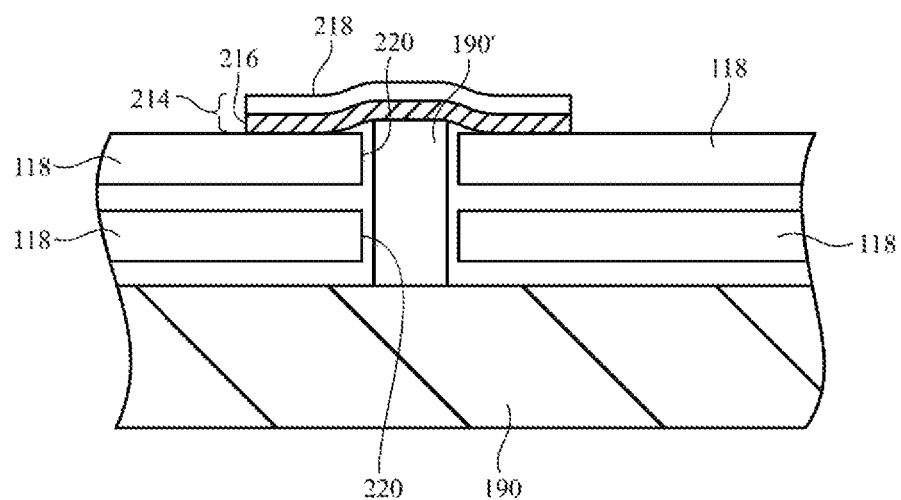
FIG. 23 is a cross-sectional side view of a portion of a registration pin in a backlight unit support structure and an associated set of backlight layers with mating registration openings in accordance with an embodiment.

FIG. 23 is a diagram showing how structures 190 and backlight layers 118 may be provided with mating alignment features. Structures 190 may, for example, have registration features such as one or more alignment pins 190'. Backlight layers 118 may have mating alignment holes 220. Openings 220 may be circular, rectangular, or other shapes, may be notches that protrude inwardly from an outer peripheral edge in each layer 118, or may have other suitable configurations. To secure backlight layers 118 to structures 190, equipment such as adhesive application tool 106 may apply a layer of tape such as tape 214 to the surface of layers 118 and pin 190', thereby attaching layers 118 in place. Tool 106 may have a gripper and robotically controlled equipment such as gripper 208 and computer-controlled arm 200 of equipment 100. Tape 214 may have a layer of adhesive such as adhesive 216 (e.g., pressure sensitive adhesive) and a flexible polymer carrier such as carrier layer 218. Other types of adhesive and backlight layer securing structures may be used if desired. The example of FIG. 23 is merely illustrative.

Figure 24:
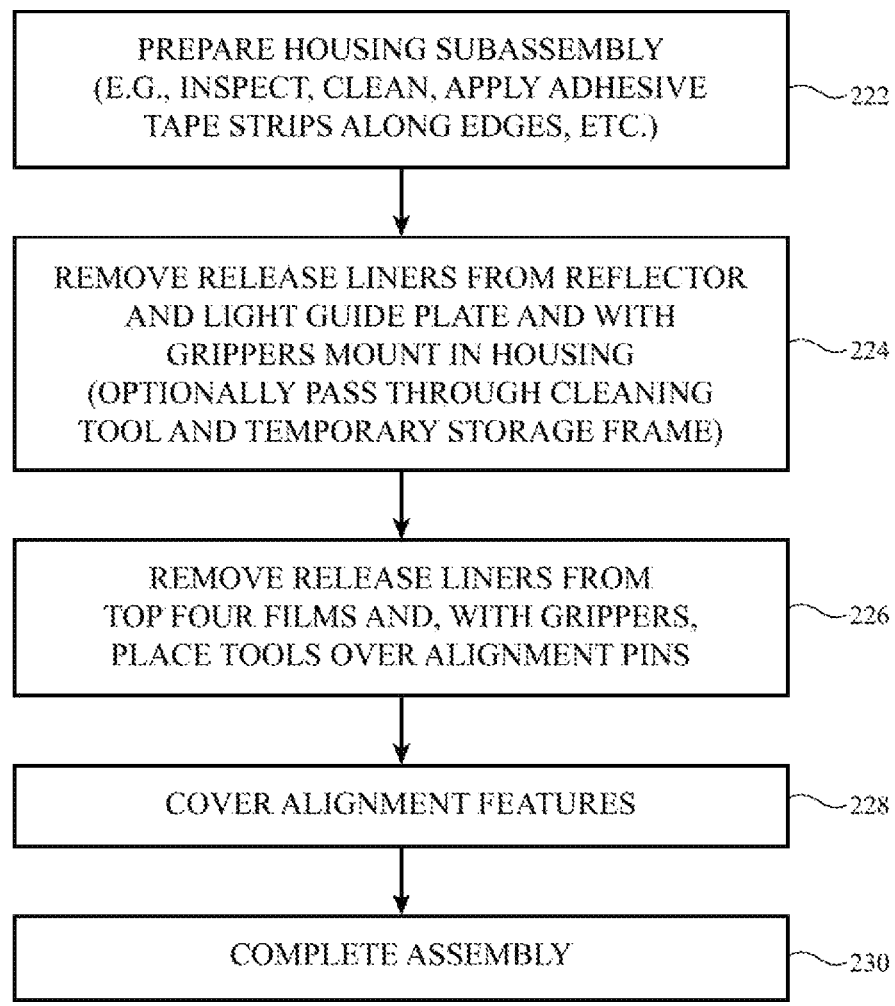
FIG. 24 is a flow chart of illustrative steps involved in assembling display layers such as display backlight layers for a backlight unit or other structure in a display in an electronic device in accordance with an embodiment.

A flow chart of illustrative steps involved in using the equipment of system 90 to assemble backlight layers 118 and other structures into backlight unit 42, display 14, and device 10 is shown in FIG. 24.

At step 222, housing 12 or other structures for receiving backlight layers 118 may be prepared to receive backlight layers 118. The structures that receive backlight layers 118 may be portions of housing 12, a plastic and/or metal backlight chassis structure, or other support structures for backlight layers 118 in backlight unit 42. The preparation operations of step 222 may include inspection operations and cleaning operations. Adhesive strips such as strips 210 and 212 may be applied to the housing or other support structures along the edges of the support structures (see. e.g., adhesive strips 210 and 212 along the right and opposing left edges of structure 190 of FIG. 22). Adhesive strips may be applied using tool 106 or other equipment in system 90 that is controlled by controller 98.

At step 224, release liners may be removed from backlight layers 118 using manual and/or automatic techniques. For example, release liners may be removed from reflector 80 and light guide plate 78 using computer-controlled release liner removal tool 92. During the operations of step 224, equipment 100 may use vacuum head 178 to position layers 118 in housing 12 and/or a chassis or other support structure 190. Camera system 94 may be used to gather image data that is used in guiding the placement of layers 118. If desired, layers 118 may be cleaned using cleaning tool 96 prior to installation in structure 190. Storage frame 114 may be used to temporarily store backlight layers 118 during processing. Translation stages or other equipment may move layers 118 between processing stations. Air streams may be applied using computer-controlled air sources 108 to help separate backlight layer 118 from each other.

At step 226, release liners may be removed from the upper and/or lower surfaces of other backlight layers 118 such as layers 70-1, 70-2, 70-3, and 70-4 of FIG. 7 using manual and/or automatic techniques. For example, release liners may be removed using computer-controlled release liner removal tool 92 or using manual removal techniques. After the release liners have been removed from these backlight layers, these backlight layers may be installed within support structure 190 using equipment 100 or other computer-controlled positioning equipment (e.g., so that alignment features in layers 118 mate with pins or other alignment features on structure 190).

At step 228, adhesive tape 214 or other structures may be used to secure layers 118 to support structure 190. Equipment 106 or other equipment in system 90 may be used to apply tape 214. Final device assembly may then be completed during the operations of step 230. During the operations of step 230, display layers 46 and the backlight unit formed from layers 118 and structure 190 may be assembled to form display 14 and display 14 may be installed within housing 12 with other device structures to form electronic device 10.

The foregoing is merely illustrative and various modifications can be made by those skilled in the art without departing from the scope and spirit of the described embodiments. The foregoing embodiments may be implemented individually or in any combination.

What is claimed is:

1. A system for assembling a display backlight unit, comprising:
   a robotic arm;
   a gripper mounted on the robotic arm;
   a controller that directs the robotic arm and the gripper to assemble display backlight layers to form the backlight unit;
   deionized air sources controlled by the controller; and
   a backlight layer storage frame, wherein the deionized air sources blow streams of air across the backlight layer storage frame to separate the backlight layers.

2. The system defined in claim 1 wherein the gripper comprises a vacuum gripper.

3. The system defined in claim 2 wherein the vacuum gripper comprises:
   a layer of porous material;
   a plenum that receives vacuum; and
   a perforated plate interposed between the plenum and the layer of porous material.

4. The system defined in claim 3 wherein the perforated plate has rows and columns of perforations.

5. The system defined in claim 4 further comprising:
   a camera system, wherein the controller controls the robotic arm based on information from the camera system.

6. The system defined in claim 1 wherein the deionized air sources comprise at least one pressurized air nozzle that blows a puff of air between the backlight layers to separate the backlight layers.

7. The system defined in claim 1 further comprising:
   a source of the backlight layers,
   wherein the backlight layer storage frame is configured to receive the backlight layers, and wherein the controller is configured to direct the robotic arm and the gripper to move the backlight layers from the source of backlight layers into the backlight layer storage frame.

8. The system defined in claim 7 further comprising a translation stage that laterally moves the backlight layer storage frame.

9. The system defined in claim 8 wherein further comprising a cleaning tool that includes a solvent dispenser that dispenses solvent onto the backlight layers and a nozzle that blows air to remove the solvent from the backlight layers.

10. The system defined in claim 9 further comprising a computer-controlled release liner removal tool that peels release liner layers from the backlight layers.

11. The system defined in claim 2, wherein the backlight layers are stored in an opening in the backlight layer storage frame, and wherein the deionized air sources blow streams of air across the backlight layer storage frame between first and second backlight layers in order to separate the first and second backlight layers while the vacuum gripper pulls the first backlight layer away from the second backlight layer.

12. A system for assembling a display backlight unit, comprising:
   a source of backlight layers;
   computer-controlled equipment that assembles the backlight layers from the source to form the backlight unit, wherein the computer-controlled equipment includes at least one robotic arm;
   a controller that controls the equipment, wherein the controller directs the at least one robotic arm to separate a first backlight layer of the backlight layers from a second backlight layer of the backlight layers; and
   deionized air sources controlled by the controller that blow streams of deionized air between the first and second backlight layers while the at least one robotic arm separates the first and second backlight layers.

13. The system defined in claim 12 wherein the computer-controlled equipment includes a vacuum gripper mounted to the at least one robotic arm that holds the backlight layers during movement of the robotic arm and wherein the backlight layers comprise layers selected from the group consisting of: a reflector layer, a light guide plate, a diffuser layer, and a prism film layer.

14. A method of assembling backlight layers to form a backlight unit, comprising:
   using at least one robotic arm to move backlight layers from a source of the backlight layers into a central opening of a temporary storage frame, wherein the backlight layers comprise layers selected from the group consisting of: a reflector layer, a light guide plate, a diffuser layer, and a prism film layer;
   separating the backlight layers from each other by blowing air between the backlight layers with a computer-controlled air source; and
   using the at least one robotic arm to place the backlight layers in a support structure.

15. The method defined in claim 14 wherein using the at least one robotic arm comprises:
   with a vacuum head attached to the at least one robotic arm, holding the backlight layers.

16. The method defined in claim 15 further comprising:
   removing release liners from the backlight layers using a computer-controlled gripper.

17. The method defined in claim 14, wherein the temporary storage frame has a base and a plurality of vertically extending guide fingers, wherein the plurality of vertically extending guide fingers define the central opening, and wherein the central opening is a central rectangular opening.

18. The method defined in claim 17, wherein the support structure comprises a backlight unit chassis.

19. The method defined in claim 14, wherein separating the backlight layers from each other comprises separating a first backlight layer from a second backlight layer, and wherein separating the first backlight layer from the second backlight layer comprises using the at least one robotic arm to separate the first backlight layer from the second backlight layer while the computer-controlled air source blows air between the first and second backlight layers.

* * * * *